(12) United States Patent
Schlipf et al.

(10) Patent No.: US 10,844,838 B2
(45) Date of Patent: Nov. 24, 2020

(54) LIDAR-BASED MULTIVARIABLE FEEDFORWARD CONTROL OF WIND TURBINES

(71) Applicant: Universität Stuttgart, Stuttgart (DE)

(72) Inventors: David Schlipf, Stuttgart (DE); Holger Fürst, Sindelfingen (DE); Florian Haizmann, Stuttgart (DE); Steffen Raach, Stuttgart (DE)

(73) Assignee: Universität Stuttgart, Stuttgart (DE)

( * ) Notice: Subject to any disclaimer, the term of this patent is extended or adjusted under 35 U.S.C. 154(b) by 0 days.

(21) Appl. No.: 16/315,313

(22) PCT Filed: Jul. 6, 2017

(86) PCT No.: PCT/EP2017/000799
§ 371 (c)(1),
(2) Date: Jan. 4, 2019

(87) PCT Pub. No.: WO2018/007011
PCT Pub. Date: Jan. 11, 2018

(65) Prior Publication Data
US 2019/0257289 A1  Aug. 22, 2019

(30) Foreign Application Priority Data
Jul. 6, 2016  (DE) .................. 10 2016 212 362

(51) Int. Cl.
*F03D 7/04* (2006.01)
*F03D 7/02* (2006.01)

(52) U.S. Cl.
CPC ............ *F03D 7/043* (2013.01); *F03D 7/0224* (2013.01); *F03D 7/0272* (2013.01);
(Continued)

(58) Field of Classification Search
CPC ..................................................... F03D 7/043
See application file for complete search history.

(56) References Cited

U.S. PATENT DOCUMENTS

| 2002/0105189 A1* | 8/2002 | Mikhail ............... F03D 7/0224 290/44 |
| 2007/0075546 A1* | 4/2007 | Avagliano ............. F03D 7/0224 290/44 |

(Continued)

OTHER PUBLICATIONS

Schlipf, David, and Po Wen Cheng. "Flatness-based Feedforward Control of Wind Turbines Using Lidar." The International Federation of Automatic Control. Cape Tow, South Africa, Aug. 24-29, 2014. p. 5820-5825.

(Continued)

*Primary Examiner* — Viet P Nguyen
(74) *Attorney, Agent, or Firm* — Shook, Hardy and Bacon L.L.P.

(57) ABSTRACT

Summarizing, the present invention relates to a control system for a wind turbine including—a feed forward controller having a rotor effective wind speed of the wind turbine as an input parameter and having a plurality of output parameters—a feedback controller wherein an input parameter is based on a rotor speed or a generator speed of the wind turbine and having at least one output parameter and wherein o one output parameter of the feed forward controller is provided to the feedback controller as an input parameter and o another output parameter of the feed forward controller is used as a feed-forward control parameter for controlling the wind turbine and o one output parameter of the feedback controller is used as a feed-back control parameter for controlling the wind turbine, as well as a wind turbine and a control method.

14 Claims, 8 Drawing Sheets

(52) U.S. Cl.
CPC ........ *F03D 7/0276* (2013.01); *F05B 2270/32* (2013.01); *F05B 2270/327* (2013.01); *F05B 2270/8042* (2013.01); *Y02E 10/72* (2013.01)

(56) References Cited

U.S. PATENT DOCUMENTS

| | | | | |
|---|---|---|---|---|
| 2009/0047116 | A1* | 2/2009 | Barbu | F03D 7/024 415/1 |
| 2010/0066087 | A1* | 3/2010 | Hayashi | F03D 7/0204 290/44 |
| 2011/0175354 | A1* | 7/2011 | Bo | F03D 7/044 290/44 |
| 2012/0128488 | A1* | 5/2012 | Kristoffersen | F03D 7/0224 416/31 |
| 2013/0035798 | A1* | 2/2013 | Zhou | F03D 7/0292 700/287 |
| 2014/0054893 | A1* | 2/2014 | Lindholdt | F03D 7/02 290/44 |
| 2015/0147175 | A1* | 5/2015 | Stoltenjohannes | F03D 7/048 416/1 |
| 2015/0369214 | A1* | 12/2015 | Herbsleb | F03D 7/022 416/1 |
| 2016/0356266 | A1* | 12/2016 | Koerber | F03D 7/044 |
| 2016/0377057 | A1* | 12/2016 | Caponetti | F03D 7/0224 416/1 |
| 2017/0022972 | A1* | 1/2017 | Kjær | F03D 7/0224 |
| 2017/0152835 | A1* | 6/2017 | Bonding | G05B 19/416 |
| 2017/0152836 | A1* | 6/2017 | Kjær | F03D 7/028 |
| 2017/0198680 | A1* | 7/2017 | Wu | F03D 7/0276 |

OTHER PUBLICATIONS

Aho, Jacob, Lucy Pao and John Hauser. "Optimal Trajectory Tracking Control for Wind Turbines During Operating Region Transitions." The American Control Conference. Washington DC, United States, Jun. 17-19, 2013. p. 1424-1429.

International Search Report and Written Opinion dated Oct. 18, 2017 in International Patent Application No. PCT/EP2017/000799, 14 pages.

* cited by examiner

LIDAR-BASED MULTIVARIABLE FEEDFORWARD CONTROL OF WIND TURBINES

CROSS-REFERENCE TO RELATED APPLICATIONS AND PRIORITY CLAIM

This Non-Provisional Patent Application claims priority to co-pending PCT Application No. PCT/EP2017/000799, filed July 6, 2017, and titled "Lidar-Based Multivariable Feedforward Control of Wind Turbines," which claims priority to German Patent Application No. 102016212362.9, filed July 6, 2016, and titled "Lidar-Based Multivariable Feedforward Control of Wind Turbines." The contents of each of these referenced applications is incorporated herein by reference in the entirety.

BRIEF OUTLINE

Current advances in lidar-technology provide the possibility of including wind preview information in the control design. Lidar-assisted collective pitch control is a simple, but promising approach to reduce the rotor speed variation and structural loads for full load operation. This work extends this approach to the transition between partial and full load operations. A multivariable controller is presented, which provides a simple update for the generator torque rate and the minimum pitch angle based on a nonlinear system inversion. The feedforward signals of the generator torque rate and the minimum pitch angle can be combined with conventional feedback controllers and the collective pitch feedforward controller for full load operation. This facilitates the modular application on commercial wind turbines. Simulations with a full aeroelastic wind turbine model and a lidar simulator show improved rotor speed regulation and significant reduction of tower loads, while only slightly decreasing power. Further, possibilities to transform the load reduction into energy increase are outlined.

BACKGROUND

Lidar is a surveying technology known to the skilled person that measures distance by illuminating a target with a laser light. Lidar is an acronym of Light Detection And Ranging, and was originally created as a portmanteau of "light" and "radar". Lidar is popularly used as a technology to make high-resolution maps, with applications in geodesy, geomatics, archaeology, geography, geology, geomorphology, seismology, forestry, atmospheric physics, airborne laser swath mapping (ALSM) and laser altimetry. What is known as Lidar is sometimes simply referred to as laser scanning or 3D scanning, with terrestrial, airborne and mobile applications.

Lidar uses ultraviolet, visible, or near infrared light to image objects. It can target a wide range of materials, including non-metallic objects, rocks, rain, chemical compounds, aerosols, clouds and even single molecules. A narrow laser-beam can map physical features with very high resolutions; for example, an aircraft can map terrain at 30 cm resolution or better.

Lidar has been used extensively for atmospheric research and meteorology. Lidar instruments fitted to aircraft and satellites carry out surveying and mapping—a recent example being the U.S. Geological Survey Experimental Advanced Airborne Research Lidar. NASA has identified lidar as a key technology for enabling autonomous precision safe landing of future robotic and crewed lunar-landing vehicles.

Wavelengths vary to suit the target: from about 10 micrometers to the UV (approximately 250 nm). Typically light is reflected via backscattering. Different types of scattering are used for different lidar applications: most commonly Rayleigh scattering, Mie scattering, Raman scattering, and fluorescence. Based on different kinds of backscattering, the lidar can be accordingly called Rayleigh Lidar, Mie. Lidar, Raman Lidar, Na/Fe/K Fluorescence Lidar, and so on. Suitable combinations of wavelengths can allow for remote mapping of atmospheric contents by identifying wavelength-dependent changes in the intensity of the returned signal.

Lidar-assisted control has become an important research topic in the wind turbine control community. During initial field testing, collective pitch feedforward control was able to reduce the rotor speed variation and structural loads during full load operation in several field tests. During partial load operation, lidar-assisted torque control shows only marginal benefit on power production while having negative impact on structural loads. Nonlinear model predictive control (NMPC) using only the collective pitch provides similar performance to collective pitch feedforward control during full load operation, but shows improved performance in the transition between partial and full load operations using additionally the generator torque. Although NMPC is becoming computationally more effective, replacing the feedback controller makes it less attractive to turbine manufacturers. The flatness-based approach allows the calculation of the control action based on trajectories of the rotor speed and tower motion and also shows improved control performance in the transition region, but is difficult to tune. In this work, an alternative is proposed, which can be more easily applied and still shows significant improvements.

Thus, based on the current technological level, there is the need to improve control of the speed of a wind turbine in a transition between a partial and a full load, to increase the energy yield and to reduce the structural loads. However, until now, the identified problem was solved by using only a feedback controller in the transition, i.e. the controller was only able to react to the variation of turbine signals such as the generator speed. A Lidar-based feedforward controller for wind turbines has so far only been used for the generator counter torque during partial load or for the collective blade angle during full load. A Lidar-based feedforward controller during the transition between partial and full load does not exist so far.

In general, feedback control for wind turbines can only react once variations of the incoming wind field have already affected on the structure of the turbine. Likewise, existing Lidar-based feedforward controllers cannot be used in the transition between partial to full load. The present invention seeks to improve the rotor speed control, to reduce the structural loads and to increase the energy yield in the transition.

This is achieved by a control system for a wind turbine and a control method for controlling a wind turbine of the invention according to claims 1 and 14, respectively, in particular via the simultaneous feedforward control of the collective blade angle and the generator counter torque, and the separation into frequency regions. Preferred embodiments are contained in the dependent claims.

It is within the knowledge of the skilled person that wind turbines extract energy from the wind. In the field of this application it is understood that downstream of a wind turbine there is a wake from the wind turbine, where wind speed is reduced and/or turbulences in the wind can occur. As the flow proceeds downstream, there is a spreading of the wake and the wake recovers towards free stream conditions. The wake effect is the aggregated influence on the energy production of the wind farm, which results from the changes in wind speed caused by the impact of the turbines on each other. It is important to consider wake effects from neighbouring wind farms and the possible impact of wind farms which will be built in the future.

In other words, a wake is the result of the energy extraction of a wind turbine (power converter) and it occurs behind it. In a wake the velocities are reduces and the turbulence intensity is increased. Speaking about (empirical) effects in a wake, one can observe the velocity deficit, the wake decay, the wake redirecting, and the wake meandering.

According to the knowledge of the skilled person the generator torque is computed as a tabulated function of the filtered generator speed, incorporating five control regions: 1, 1½, 2, 2½, and 3. Region 1 is a control region before cut-in wind speed, where the generator torque is zero and no power is extracted from the wind; instead, the wind is used to accelerate the rotor for start-up. Region 2 is a control region for optimizing power capture. Here, the generator torque is proportional to the square of the filtered generator speed to maintain a constant (optimal) tip-speed ratio. In Region 3, the generator power is held constant so that the generator torque is inversely proportional to the filtered generator speed. Region 1½, a start-up region, is a linear transition between Regions 1 and 2. This region is used to place a lower limit on the generator speed to limit the wind turbine's operational speed range. Region 2½ is a linear transition between Regions 2 and 3 with a torque slope corresponding to the slope of an induction machine. Region 2½ is typically needed (as is the case for any 5-MW turbine) to limit tip speed (and hence noise emissions) at rated power.

The terms "feed forward" and "feedforward" are treated as equivalent within this text and may be used and read interchangeably.

BRIEF DESCRIPTION OF THE INVENTION

One aspect of the application relates to a control system for a wind turbine including
- a feed forward controller having a rotor effective wind speed of the wind turbine as an input parameter and having a plurality of output parameters
- a feedback controller wherein an input parameter is based on a rotor speed or a generator speed of the wind turbine and having at least one output parameter and wherein
  - one output parameter of the feed forward controller is provided to the feedback controller as an input parameter and
  - another output parameter of the feed forward controller is used as a feed-forward control parameter for controlling the wind turbine and
  - one output parameter of the feedback controller is used as a feed-back control parameter for controlling the wind turbine.

Advantageously, the system as described in the present application is less complex and complicated, in particular less computationally intensive than conventionally known systems and methods. Also, advantageously, the system as described in the present application effectively combines the feedforward signals of the generator torque rate and the minimum pitch angle with conventional feedback controllers and the collective pitch feedforward controller for full load operation. Also advantageously the (mean) pitch angle can be adjusted in the partial load operation thus resulting in a higher energy output of the windfarm.

In other words, the present application relates to a lidar-assisted feedforward controller preferably being a component and/or covered by the claimed system, wherein the controller commands the collective blade pitch and the generator torque during the transition between partial load operation and full load operation. Advantageously, the system provides for and/or allows a direct combination with full load operation lidar feedforward controllers.

Further advantageously system provides for and/or allows the direct add-on to any commercial feedback controller.

The system allows leveraging the benefits of remote sensing information in terms of higher energy yield or structural load reduction.

Advantageously, the system is independent of the measurement system (not specific for one manufacturer or system type) and/or independent of the turbine type.

Preferably, the controller is used in the 2.5 region of a wind turbine. Advantageously, an approach is provided that is simple as highly applicable for wind turbines.

The term "rotor effective wind speed" is well known to the person skilled in the art. As defined in e.g. "Lidar-Assisted Control Concepts for Wind Turbines" (dissertation of David Schlipf, which is herewith included by reference in its entirety) the rotor effective wind speed is a scalar wind speed causing the same or a comparable dynamic effect for the wind turbine as a non-uniform turbulent wind field (3D vector field defined on the rotor disc). It can be calculated as an average over the rotor disc with or without weighting.

Further preferably,
- one or more output parameters of the feed forward controller are provided to the feedback controller as input parameter(s) and
- one or more other output parameters of the feed forward controller are used as a feed-forward control parameter(s) for controlling the wind turbine and
- one or more output parameters of the feedback controller are used as feed-back control parameter(s) for controlling the wind turbine.

According to an embodiment of the control system the feed-forward control parameter of the wind turbine is controlling the pitch angle of the rotor blades of the wind turbine.

Advantageously, due to the application of pitch angle of the rotor blades the controller can be easily implemented in conventional systems and can be used in the 2.5 region. Further advantageously, due to the application of the pitch angle of the rotor blades, the controller can be easily used in combination with a conventional controller in the 3 region that is solely based on pitch angle control.

Further advantageously, compared to a conventional rotor in the 2.5 region, that is solely based on controlling the torque, the controller according to the present application allows to increase the power gain that can be obtained by the wind turbine.

According to an embodiment of the control system the feed-back control parameter of the wind turbine is controlling the torque of the power generator of the wind turbine.

Advantageously, due to the application of torque the controller can be easily implemented in conventional systems and can be used in the 2.5 region. Further advantageously, due to the application of the torque, the controller can be easily used in combination with a conventional controller in the 2 region that is solely based on the torque.

According to an embodiment of the control system the output parameter of the feed forward controller that is provided to the feedback controller as an input parameter is an updated generator torque rate.

According to an embodiment of the control system the output parameter of the feed forward controller that is used as a feed-forward control parameter of the wind turbine is an updated pitch angle of the rotor blades According to an embodiment of the control system the rotor effective wind speed is obtained using a Lidar device.

According to an embodiment of the control system the output parameters of the feed forward controller are calculated based on the input parameter and assuming that no dynamics for a rotor and a tower motion of the wind turbine are desired.

According to an embodiment of the control system the output parameters of the feed forward controller are calculated such that the impact of the rotor effective wind speed of the rotor and tower motion is compensated.

According to an embodiment of the control system the change over time of the desired rotor speed is reduced, preferably equals zero and/or the change over time of the fore-aft displacement of the tower of the wind turbine is reduced, preferably equals zero and/or wherein the acceleration of the fore-aft displacement of the tower of the wind turbine is reduced, preferably equals zero.

According to an embodiment of the control system the control system is used to control the wind turbine in a transition from an operation of aerodynamic optimality to a full load operation.

According to an embodiment of the control system the control system is limited to control the wind turbine in a transition from an operation of aerodynamic optimality to a full load operation.

According to an embodiment of the control system
the feedback controller has exactly one output parameter and wherein
a feed forward controller has exactly two output parameters.

In an embodiment, the feedback controller can have two or more output parameters, such as torque and/or pitch angle of the rotor blades. However, when applied in the 2.5 region only one parameter, namely torque, is used. In other words, in such a situation only one parameter, namely torque is output.

An aspect of the invention relates to a wind turbine including a control system according to the invention, a power generator and a plurality of rotor blades.

An aspect of the invention relates to a control method for controlling a wind turbine including the following steps
obtaining a rotor effective wind speed of the wind turbine and providing the rotor effective wind speed as an input parameter to a feed forward controller;
providing, by the feed forward controller, one output parameter referred to as feed forward control parameter for controlling the wind turbine;
providing, by the feed forward controller, another output parameter referred to as feed forward input parameter as an input parameter of a feedback controller;
providing by the feedback controller one output parameter referred to as feedback control parameter for controlling the wind turbine wherein said feedback control parameter is based on at least said feed forward input parameter and rotor speed or a generator speed of a power generator of the wind turbine.

According to an embodiment one or more of the steps are repeatedly carried out. Specifically, one or more of the steps are carried out iteratively. According to a preferred embodiment, one the results of one or more of the steps of the method are used as input of one or more of the remaining method steps. Due to this feedback of parameters and/or values, in an iterative way, the method allows to provide an improved control of the wind turbine.

DETAILED DESCRIPTION OF THE INVENTION

I. Modeling of the Wind Turbine

In this study, a full model of a 5 MW reference turbine is used for simulations. A reduced version of the same turbine is used for the controller design.

A. Full Simulation Model

Simulations are done with the aero-elastic simulation tool FAST. In FAST, an onshore wind turbine structure is modeled by a flexible multibody system, which experiences external forces from aerodynamics. The structural model represents dynamics of flexible parts such as the tower, blades, and drive train. The following 15 degrees of freedom (DOF) are enabled in the simulations: first and second flapwise modes and first edgewise mode of three blades, first and second side-to-side and fore-aft tower bending modes, rotor motion and drive train flexibility. Two different types of wind input files can be loaded to the aerodynamic subsystem. Coherent time series of wind characteristics such as wind speed, direction, and shears are used for the extreme load calculations in Section IV-A. The fatigue simulations in Section IV-B are done with a turbulent three-dimensional wind field over the rotor disk generated with TurbSim. In both cases, aerodynamic forces along the blades are calculated iteratively by applying the Blade Element Momentum theory and transferred to the structural model. The described simulation tools have proven to have reliable accuracy which justifies its application as a full simulation model in this work.

B. Reduced Controller Design

The aero-elastic model is not useful for controller design due to its complexity and the iterative calculation of the aerodynamics. Here, the SLOW (Simplified Low Order Wind turbine) model from the flatness-based approach is used with some minor changes. Similar to the full simulation model, SLOW consists of a reduced servo-elastic and aerodynamic module, see FIG. 1.

Figure 1:
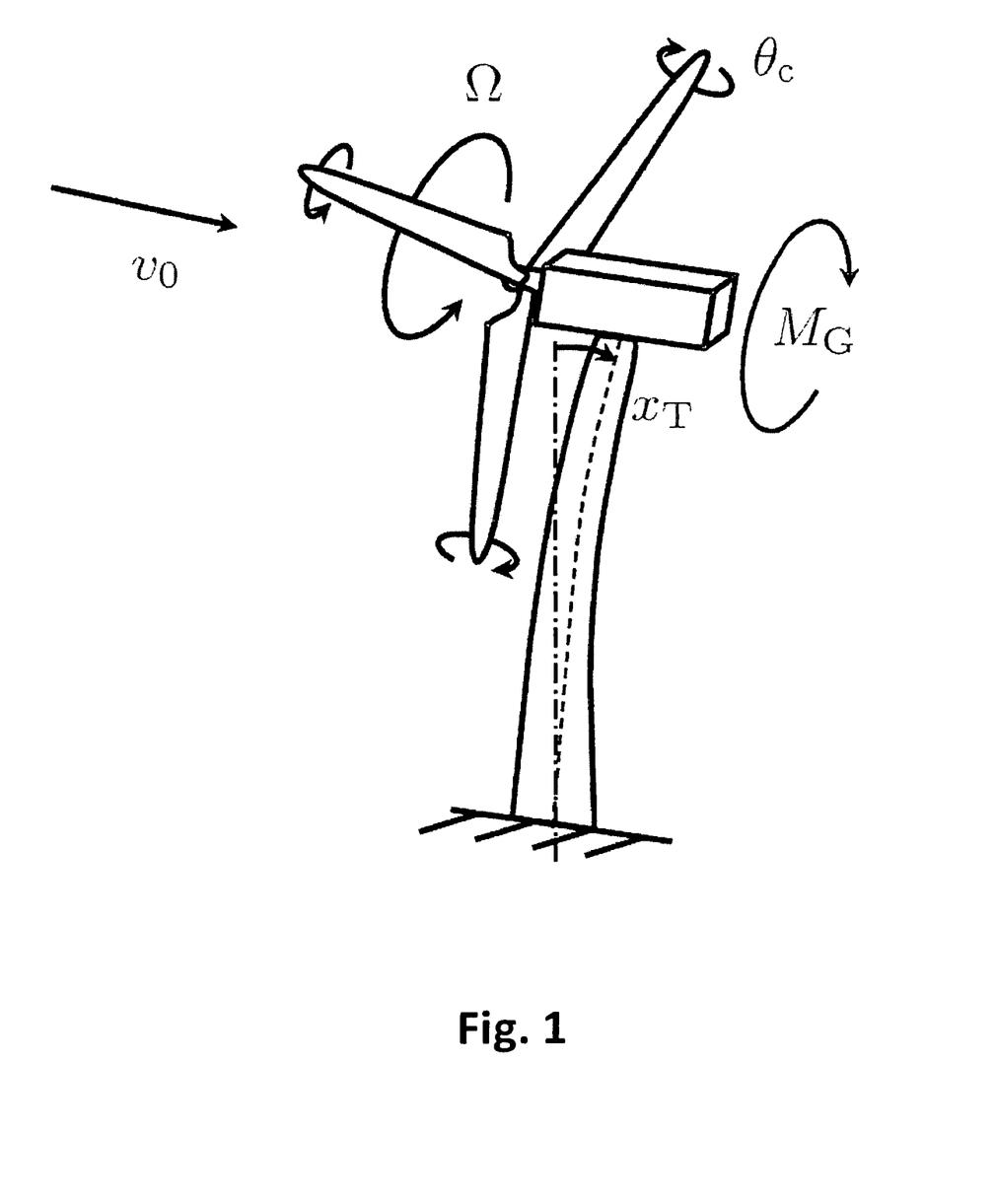
FIG. 1 illustrates the degrees of freedom for the reduced non-linear model.

In the servo-elastic part, only the first tower fore-aft bending mode and the rotational motion are considered:

$$J\dot{\Omega} + \frac{M_G}{i_{GB}} = M_a \quad (1a)$$

$$m\ddot{x}_T + c\dot{x}_T + k(x_T - x_{0T}) = F_a \quad (1b)$$

Equation (1a) models the rotor dynamics, where $\Omega$ is the rotor speed, $M_a$ is the aerodynamic torque and MG the generator torque. Moreover, $i_{GB}$ is the gearbox ratio and J is the overall sum of the moments of inertia of rotor and hub about the rotation axis. Equation (1b) describes the tower fore-aft dynamics, where $F_a$ is the aerodynamic thrust, $x_T$. the tower top fore-aft displacement, $x_{0T}$. the static tower top fore-aft displacement, and m, c, and k are the tower equivalent modal mass, structural damping, and bending stiffness, respectively.

In the aerodynamic part, the aerodynamic torque and thrust acting on the rotor with the radius R are $$M_a = \frac{1}{2}\rho\pi R^3 \frac{c_P(\lambda, 0)}{\lambda} v_{rel}^2 \quad (2a)$$

$$F_a = \frac{1}{2}\rho\pi R^2 c_T(\lambda, 0) v_{rel}^2 \quad (2b)$$

where $\rho$ is the air density, $\lambda$ the tip-speed ratio, defined as $$\lambda = \frac{\Omega R}{v_{rel}} \quad (3)$$

and $c_\rho$ and $c_\tau$ are the effective power and thrust coefficients, respectively. Two dimensional look-up tables are used to obtain these coefficients, which are precalculated from steady state simulations with the full simulation model. The relative wind speed vrel is used to model the aerodynamic damping and is defined as the superposition of the tower top speed $\dot{x}_\tau$ and the rotor effective wind speed $v_0$:

$$V_{rel} = (v_0 - \dot{x}_\tau) \quad (4)$$

II. Simulation of Lidar Measurements

For the lidar-assisted control of the collective pitch and generator torque, a preview of the rotor effective wind speed $v_0$, is necessary. Current lidar technology provides the possibility to measure the speed of aerosols in front of the turbine by back-scattered light. Due to limitations in the lidar measurements, only the lidar estimate of the rotor effective wind speed $v_{OL}$ can be provided. Here, the same generic wind field applied to the aero-elastic simulation is scanned with a lidar simulator. The scan trajectory is optimized to provide the best coherence bandwidth for the measurements on the NREL 5 MW wind turbine based on known work.

Taylor's frozen turbulence hypothesis, which assumes that the turbulent wind field moves unaffected with the average wind speed, is used in the simulation of the measurements as well as for the wind speed estimation. Here, all measurements are condensed to the lidar estimate of the rotor effective wind speed $V_{OL}$.

III. Controller Design

In this section, the feedback controller for the transition region is designed. Then, the advantages and disadvantages of the flatness-based approach are discussed. Eventually, the lidar-assisted multivariable feedforward controller is derived for the cases of perfect and realistic wind preview.

A. Feedback Controller

In this work, only the transition (usually referred to as "region 2.5") between the operation of aerodynamic optimality ("region 2") and the full load operation ("region 3") is considered. The baseline feedback controller for the 5 MW reference wind turbine leaves region 2 at 10.3 m/s and Q=11.7 rpm and then adjusts the generator torque $M_G$ linearly with increasing rotational speed until reaching region 3 at 11.3 m/s and $\Omega_{rated}$=12.1 rpm.

However, commercial wind turbines often use a PI torque controller. The advantages are that the turbine can be operated with aerodynamic optimality over a larger range and the closed loop behavior can be tuned. The transition to region 2 is usually done by adjusting the lower limit of the torque PI controller using an optimal state feedback of region 2. Usually, a torque or power error term needs to be included in the pitch PI controller in addition to the speed error to have a smooth transition to region 3 and to prevent the pitch from acting during low wind speeds.

Figure 2:
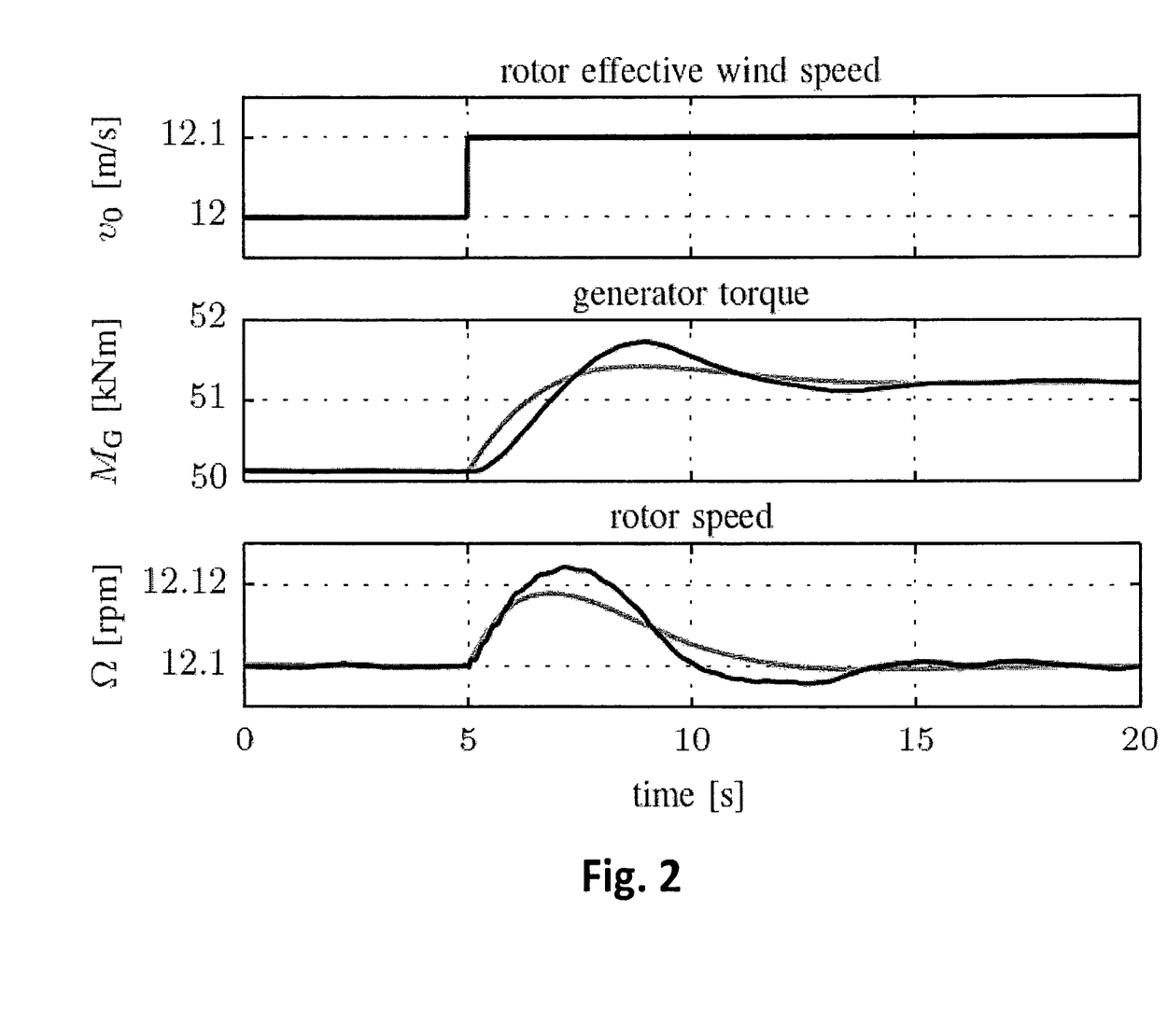
FIG. 2 illustrates a review of feedback controller design with a wind speed step, showing the desired behaviour in gray and the full simulation model in black.

For this work, a generator torque feedback controller (FB) is designed by using the closed-loop-shaping method from the collective pitch controller design. The rotor motion (1a) is linearized at 12 m/s and the proportional and integral gains are chosen, such that the closed loop from wind speed $v_0$ to generator speed $\Omega_G = \Omega/i_{GB}$ has a damping of 0.7 and a natural frequency of 0.6 rad/s. The response of the full simulation model to a wind speed step from 12 m/s to 12.1 m/s is close to the desired behavior, see FIG. 2. The deviations are due to the generator torque filter and the dynamics neglected in the design approach.

The rated power is increased to 8 MW to have a sufficiently large region 2.5 (ranging now from 10.6 m/s to 13.6 m/s) to test the designed feedback and feedforward controller. Increasing the rated power of wind turbines of the same size while keeping the same rotor and rotor speed has been done by industry and thus seems to a realistic scenario. The Senvion 6.2M126 with rated power of 6.2 MW is based on the 5M with 5 MW. The rated power of the Enercon E-126 was increased from 6 MW to 7.6 MW. More details can be found on the company websites.

The pitch feedback controller is not further considered in this paper, since all simulations are performed only in region 2.5, where the pitch angle is limited to $\theta_{min}$=0 deg.

Figure 3:
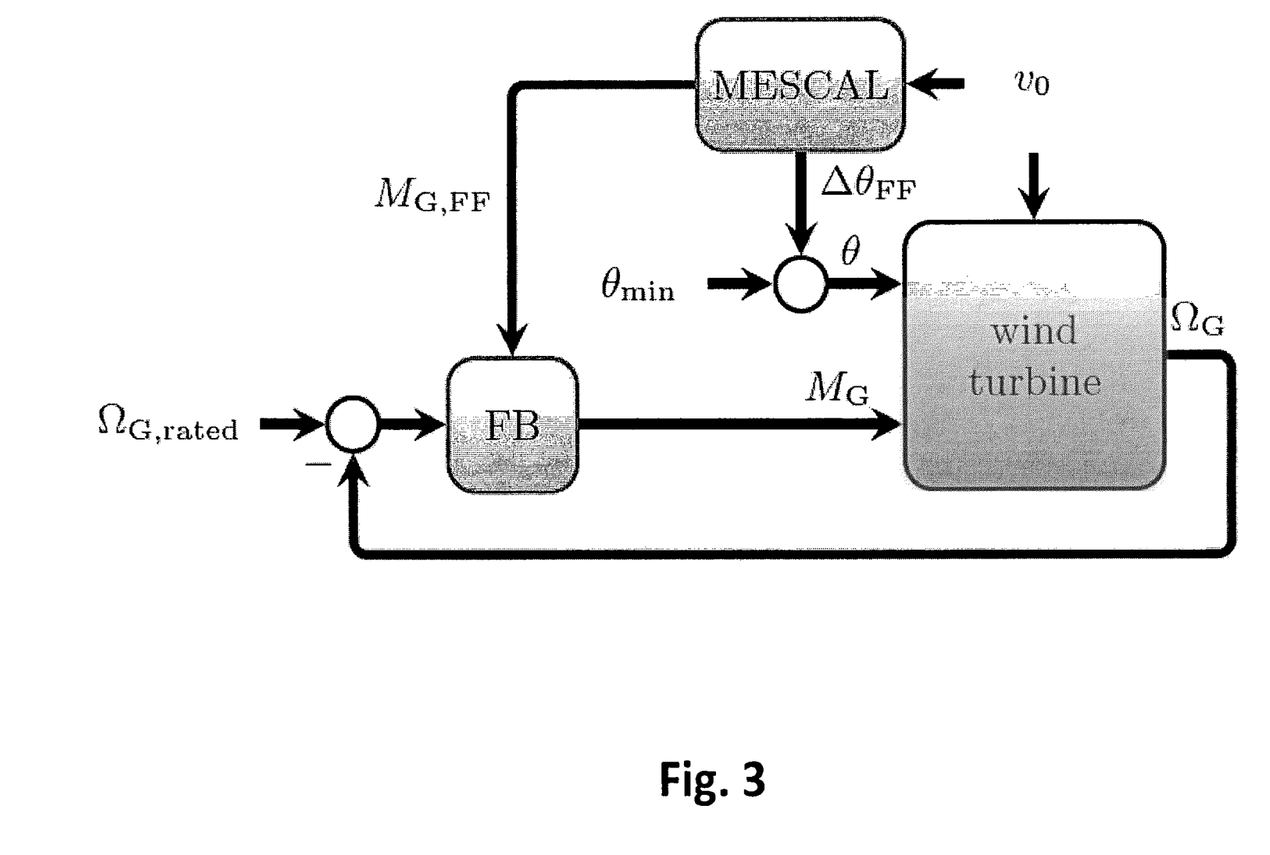
FIG. 3 shows a control loop with feedback and multivariable feedforward.

FIG. 3 shows the overall control loop.

B. Pros and Cons of the Flatness-Based Approach

A flatness-based feedforward controller has already been introduced. Based on the wind speed preview and considering system constraints, trajectories of the rotor speed and tower motions are continuously designed during operation and with an inverse wind turbine model translated into trajectories for the pitch angle and the generator torque. The trajectories are planned to minimize the tower movements during the transition between partial and full load operations. The approach has the following advantages:

The feedforward controller is nonlinear and can be used in all regions without scheduling.

Tower and rotor motion are directly reduced by a feedforward of the pitch angle and generator torque.

It can be combined with a conventional feedback controller.

All feedforward signals have zero-mean and can be set to zero, if problems with the wind preview are detected.

Is computationally less expensive compared to NMPC.

However, there are also disadvantages compared to the collective pitch feedforward controller used in known literature:

The trajectory planning for the rotor and tower motion is difficult to tune.

Pitch angle and generator torque trajectories are not directly designed and might result in extreme inputs.

The overall concept is quite complicated.

The feedforward controller presented in the next subsections lacks these disadvantages, but abandons the first advantage by linearizing and simplifying the flatness-based approach for the region 2.5. The other advantages can be maintained.

C Multivariable Extension based on Simplified Calculations

The Multivariable Extension based on Simplified Calculations (MESCAL) is derived in three main steps:
1) Calculation of control actions.
2) Linearization and control actions.
3) Combination with feedback.

In the first step, the inverse model of the flatness-based controller is used to calculate the desired generator torque and pitch angle to mitigate the effect of changes in the rotor effective wind speed $v_0$ to the rotor and tower motion for a given operating point. In contrast to the flatness-based feedforward controller, no dynamics for the rotor and tower motion are designed ($\dot{\Omega}_d = \dot{x}_{\tau,d} = \ddot{x}_{\tau,d} = 0$). With the desired rotor speed $\Omega_d = \Omega_{rated}$ and using (3), the desired tip speed ratio $\lambda_d$ is $$\lambda_d = \frac{\Omega_d R}{v_0} \quad (5)$$

With the desired tower top displacement $x_{\tau,d}$ and using (1b) and (2b), the desired thrust coefficient is $$c_{T,d} = \frac{2F_{a,d}}{\rho \pi R^2 v_0^2} \text{ with } F_{a,d} = k(x_{T,d} - x_{0T}) \quad (6)$$

Using a inverse $\theta(\lambda, c_\tau)$ of the look-up table $c_\tau(\lambda,0)$, one obtains the desired pitch angle $$\theta_d = \theta(\lambda_d, c_{96,d}) \quad (7)$$

Finally, the desired generator torque MG,d can be obtained using (1a) and (2a):

$$M_{G,d} = i_{GB} \frac{1}{2} \rho \pi R^3 \frac{c_P(\lambda_d, \theta_d)}{\lambda_d} v_0^2 \quad (8)$$

If the generator torque and pitch angle of the SLOW model follow the desired values $M_{G,d}$ and $\theta_d$, the rotor and tower motions are unaffected by changing wind speed $v_0$. To visualize the control action, $M_{G,d}$ and $\theta_d$ are calculated for the operating point at $v_{0p}$=12 m/s and for wind speeds with ±0.5 m/s and are plotted in FIG. 4.

Figure 4:
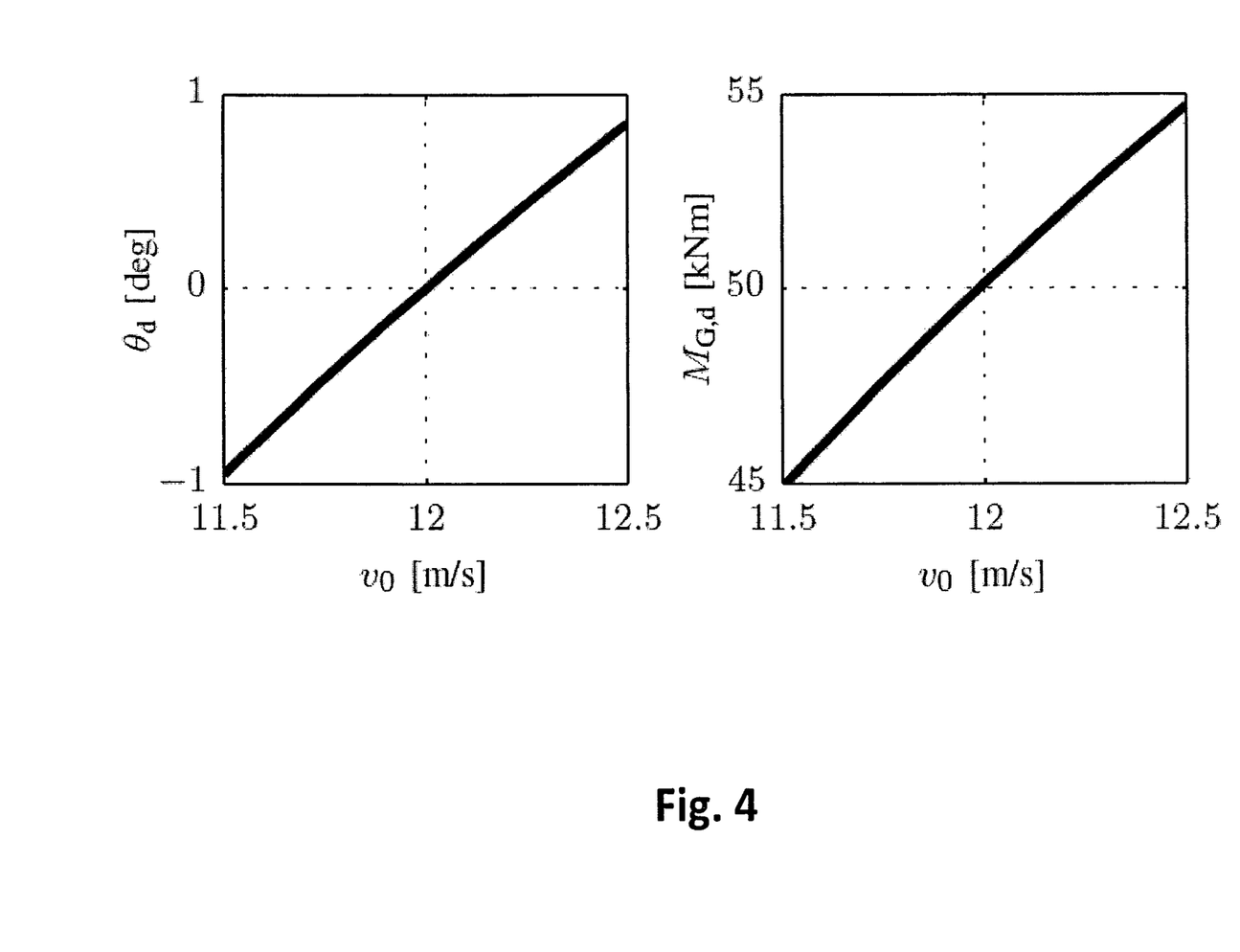
FIG. 4 illustrates the necessary pitch angle and generator torque to maintain the wind turbine in its steady state for wind speed deviations from 12 m/s.

In the second step, $M_{G,d}$ and $\theta_d$ are approximated by linear functions in $v_0$ with regression coefficients $a_G, b_G, a_\rho$, and $b_\rho$:

$$M_{G,d} \approx a_G + b_G(v_0 - v_{op}) \quad (9a)$$

$$\theta_d \approx a_p + b_p (v_0 - v_{op}) \quad (9b)$$

In the third step, the feedforward actions are combined with the feedback controller in region 2.5 as depicted in FIG. 3. A generator torque rate updated is added to the integral term of the torque feedback controller similar to the collective pitch rate update used in known literature:

$$\Delta\theta_{FF} = b_\rho(v_0 - \bar{v}_0) \quad (9a)$$

Performing the same for the pitch angle would not have the desired effect, since the integrator of the PI pitch controller will have negative, values in region 2.5. Therefore, a feedforward updated to the minimal pitch angle $\theta_{min}$ is used:

$$\Delta\theta_{FF} = b_p(v_0 - \bar{v}_0) \quad (11)$$

where $\bar{v}_0$ is a low pass filtered value of $v_0$ to account for changing wind speeds and to avoid excessive pitch action in region 2.5. Here, a first-order linear filter with a cutoff frequency of f=0.01 Hz is used. The filter allows slow movements of the tower and thus fulfills a similar role to the tower trajectory planning of the flatness-based controller. However, the next section will show, that the tuning of $f_{on}$ is more intuitive compared to the trajectory planning. A low pass filter is used instead of a high pass filter, because $\bar{v}_0$ can be calculated from the wind preview before shifting it in time and thus less phase delay is achieved. Additionally, in a future work $\bar{v}_0$ can be used to adjust the minimum pitch angle $\theta_{min}$ as proposed in known literature and to schedule $b_p$, if necessary.

The feedforward controller might be derived directly from a linearized model with a similar outcome. Here, the relationship to the flatness-based controller is pointed out.

D. Adjustment for Realistic Wind Preview

Using a lidar system, the rotor-effective wind speed $v_0$ cannot be measured perfectly as discussed in Section II. While in known work the measurement coherence is directly included in the control design, a prefilter is here used in addition to the controller. Previous work showed, that the transfer function between $V_{0L}$ and $v_0$ is the optimal prefilter for the lidar estimate to remove all uncorrelated frequencies. A first-order low pass filter with a cut-off frequency of $f_{off}$=0.134 Hz is fitted to the transfer function.

IV. Simulation Results

In this section, the multivariable feedforward controller is evaluated by simulations first using perfect wind preview and then using simulated lidar measurements.

A. Simulations Using Perfect Wind Preview

In a first simulation study, the feedforward controller is tested assuming perfect wind preview to verify that the design objectives (less rotor and less tower motion) can be achieved for the full simulation model.

Figure 5:
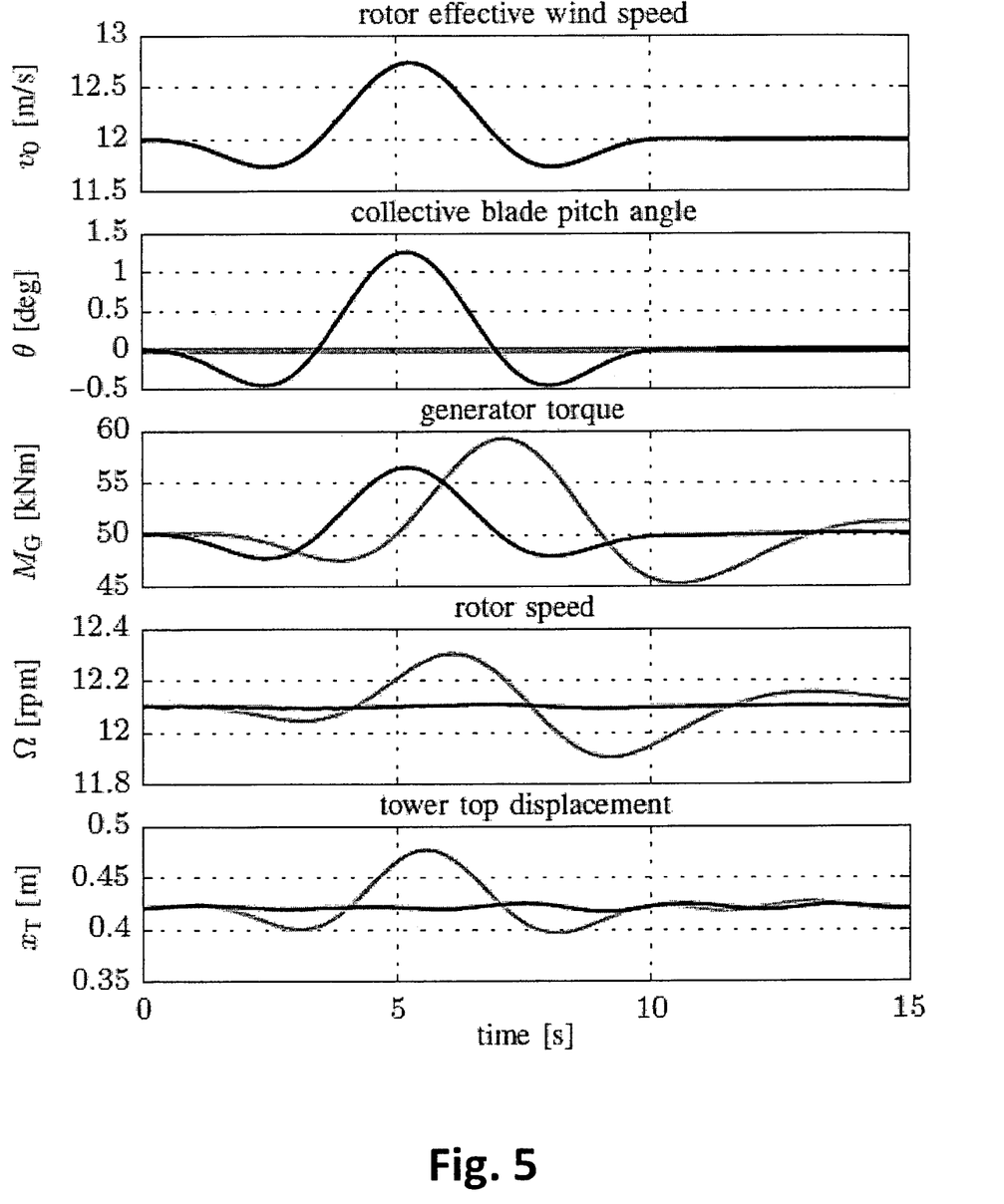
FIG. 5 demonstrates the reaction to a small gust at 12 m/s with perfect wind preview, for feedback controller only (gray) and with additional feedforward (black).

Therefore, the full aero-elastic model is disturbed by a coherent gust at 12 m/s similar to known work, but only with 1 m/s amplitude (minimum to maximum) to stay within region 2.5. The proposed feedforward controller can achieve almost perfect cancellation of the effect from $v_0$ to and $\Omega$ and $x_\tau$, see FIG. 5. The overshoot of the rotor speed (deviation from $\Omega_{rated}$=12.1 rpm) can be reduced by 95.9% and the maximum tower base fore-aft bending moment $M_{y\tau}$ by 10.9% compared to the feedback controller, see Table I.

TABLE I

Maximum values of simulation with perfect wind preview

|  | FB | FB + FF | $\frac{FB+FF}{FB}$ [%] |
|---|---|---|---|
| $\Delta\Omega$ [rpm] | 0.203 | 0.008 | 4.1 |
| $M_{yT}$ [rpm] | 79.4 | 70.7 | 89.1 |

The proposed feedforward controller demonstrates a good robustness against model uncertainties. Although the controller is designed with a nonlinear model with only two DOFs (rotor and tower motion) and static aerodynamics, it is able to almost perfectly cancel out the effect from the rotoreffective wind to the rotor speed and tower displacement for a full aero-elastic model with 15 DOFs. Thus, the results are consistent with the control objectives.

Simulations Using Simulated Lidar Measurements

In a second simulation study, the robustness against wind measurement errors of the simulated lidar system is examined. For this investigation, a turbulent wind field with a mean wind speed of $\bar{u}$=12 m/s, a very low turbulence intensity (7%) and a length of over 1 h is generated using TurbSim. The low turbulence is chosen to stay in region 2.5, which helps to isolate and to better understand the benefit of the proposed feedforward controller.

Figure 6:
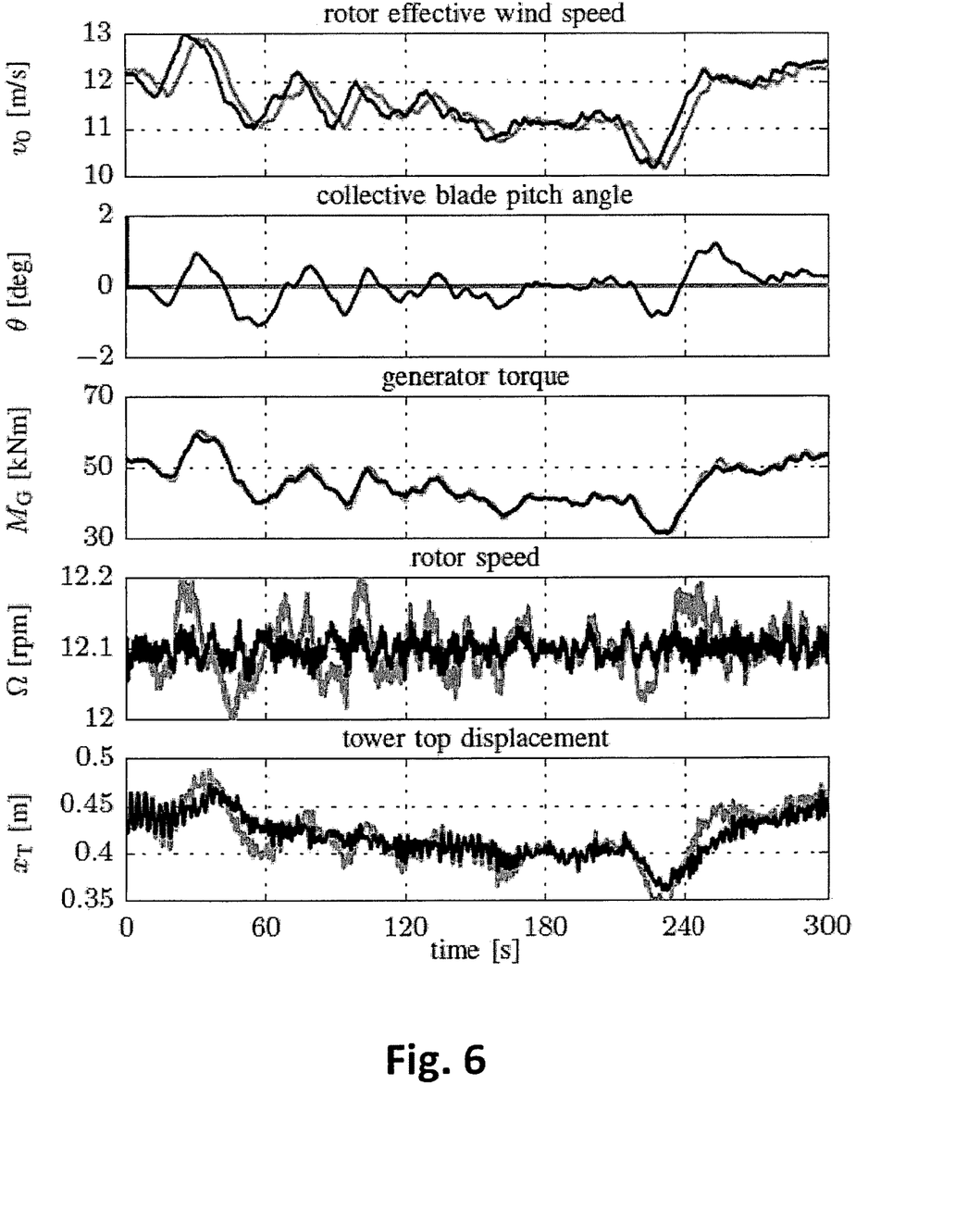
FIG. 6 demonstrates the reaction to a turbulent wind field. The top frame showing rotor-effective wind speed (gray) and its lidar estimate (black). The remaining frames showing feedback controller only (gray) and with additional feedforward (black) using simulated lidar measurements.
Figure 7:
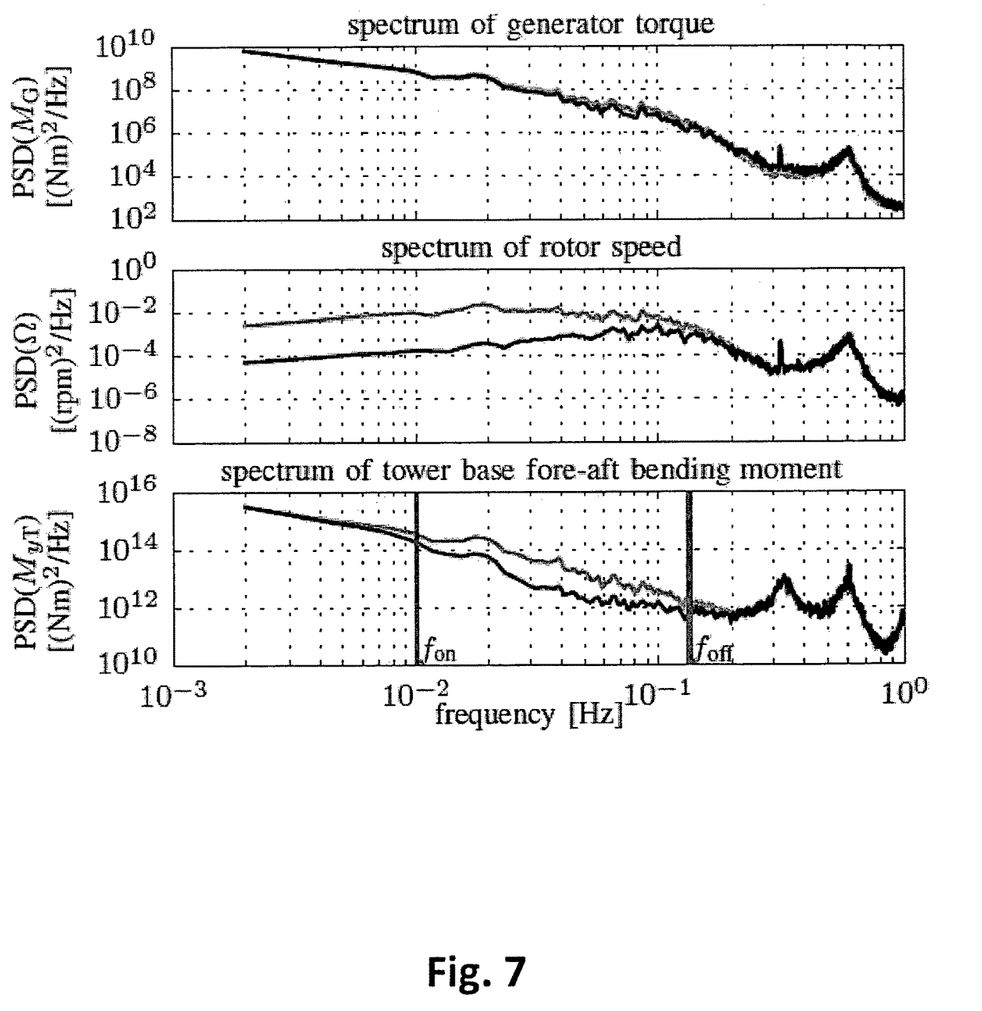
FIG. 7 demonstrates power spectral densities for the 1 hour simulation: Feedback controller only (gray) and with additional feedforward (black). Corner frequencies of used filters are shown in red.

FIG. 6 illustrates a representative 5 min period of the simulation. In the top part of the figure, the time shift and a good agreement between the rotor-effective wind speed from the wind field and its lidar estimate can be observed. Due to the limitations of the lidar measurements and the not exact preview, a perfect performance similar to the previous section cannot be expected. However, with this more realistic wind preview, the variations in the rotor speed $\Omega$ and tower top displacement $x_\tau$ are still reduced significantly. The effect of the multivariable feedforward controller in the frequency domain is visible in the Power Spectral Densities (PSDs) in FIG. 7. The multivariable feedforward controller can significantly reduce the influence of the wind disturbance to the rotor speed at low frequencies, mainly by the generator torque rate update. Since the adaptive filter has a cut-off frequency at $f_{off}$=0.134 Hz, the improvement minimizes above this frequency and no reduction is achieved at the damped eigenfrequency of the tower (0.322 Hz) and the 3P (three-times-per-revolution) frequency (0.601 Hz). In addition, the spectrum of the generator torque is reduced at low frequencies. This effect is similar to the collective pitch feedforward controller, where less pitch action is necessary to reduce the rotor speed variation. The tower base foreaft bending moment is also significantly reduced for low frequencies up to $f_{off}$. However, the reduction starts at $f_{on}$=0.01 Hz, since by (11) and the used low pass filter, pitch actions below this frequency are hindered.

Finally, Table II summarizes the results of the 1 h simulation at 12 m/s. Over 55% reduction in the standard deviation of the rotor speed can be achieved. For the calculation of the Damage Equivalent Loads (DELs), a reference number of cycles $2\times10^6$ is used. Further, a Wohler exponent of 4 is assumed for the fatigue load calculation of the tower base fore-aft bending moment $M_{yT}$, and the low-speed shaft torque $M_{LSS}$. For $M_{oop1}$, the out-of-plane blade root bending moment of blade 1, a Wohler exponent of 10 is applied. Besides the load reduction on the tower base (15%), additional load reductions on shaft and blade root (6% and 5%, respectively) are achieved. Taking into account the low turbulence intensity, the load reduction is promising.

TABLE II

Results for the 1 h simulation with turbulent wind

|  | FB | FB + FF | $\frac{FB+FF}{FB}$ [%] |
|---|---|---|---|
| STD ($\Omega$) [rpm] | 0.0346 | 0.0154 | 44.6 |
| DEL($M_{yT}$) [MNm] | 24.0 | 20.2 | 84.3 |
| DEL($M_{LSS}$) [MNm] | 2.64 | 2.47 | 93.7 |
| DEL($M_{oop1}$) [MNm] | 5.76 | 5.50 | 95.4 |
| STD ($\theta$) [deg/s] | 0 | 0.0702 | $\infty$ |
| EP [MWh] | 5.663 | 5.655 | 99.9 |

Figure 8:
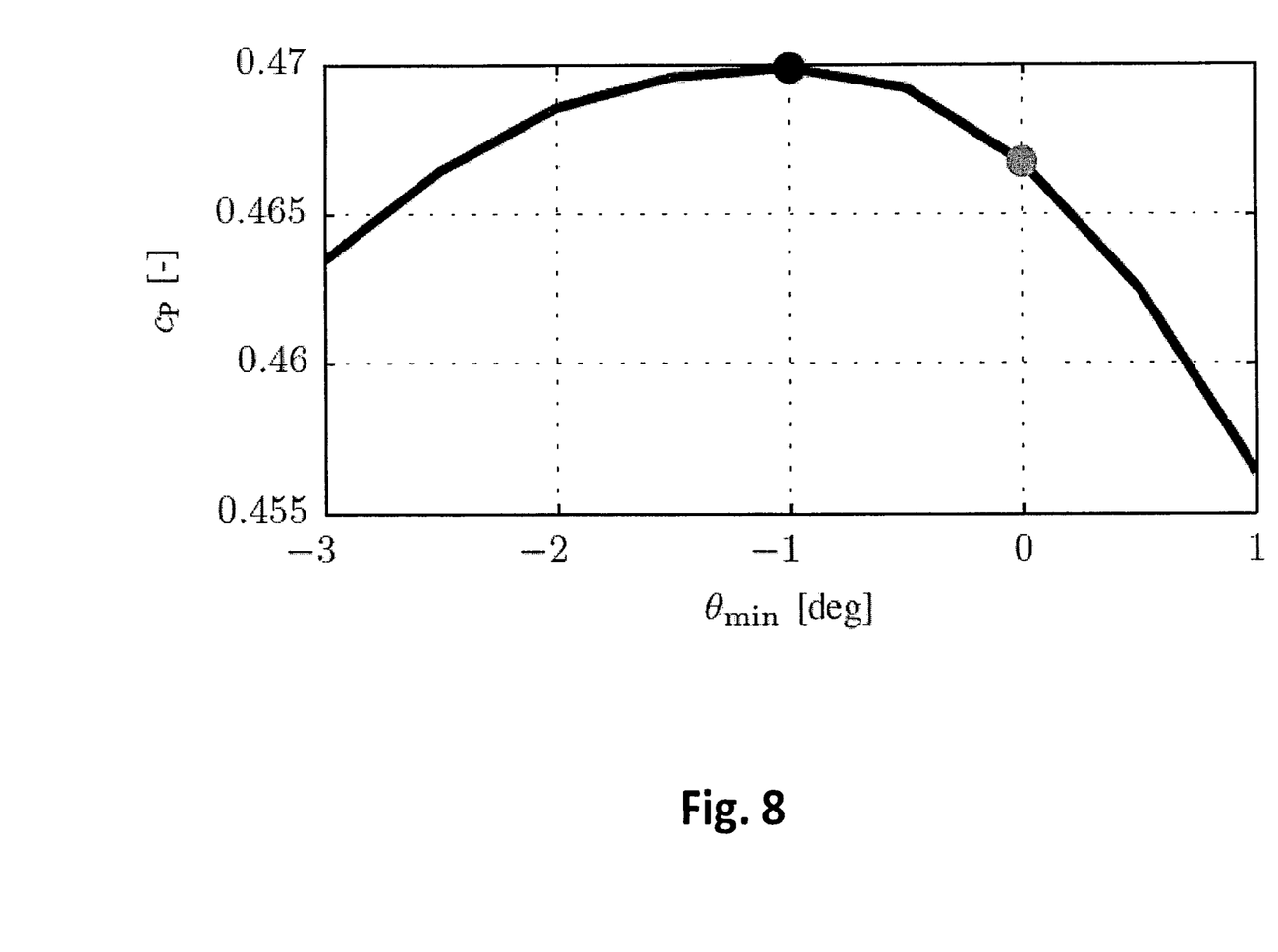
FIG. 8 shows the power coefficient at 12 m/s and rated rotor speed. By changing the minimum pitch angle from 0 deg (gray) to −1 deg (black), the power coefficient can be increased from 0.4668 to 0.4699 (0.66%).

The improvements come with some worsening. The increase in pitch activity (represented by the standard deviation of the pitch rate) in considered to be not relevant, because in full load operation, the pitch rate is more than ten times larger. However, the loss in energy production (EP) of 0.14% is not insignificant. However, using both the multivariable feedforward and the adjustments of the minimum pitch angle might result in load reduction and increase in energy production. FIG. 8 shows the power coefficient $c_p$ at $v_0$=12 m/s and $\Omega=\Omega_{rated}$ (resulting in $\lambda$=6.65). By changing the minimum pitch angle $\theta_{min}$ from 0 deg to −1 deg, the power coefficient can be increased by 0.66%. The optimal minimum pitch angle changes with the mean wind speed and the benefit is increasing closer to region 3. Thus, it can be expected that lidar measurements can be used to adjust $\theta_{min}$ and to increase the energy production even above the aforementioned losses.

V. Conclusions and Outlook

This paper presents a multivariable feedforward controller for wind turbines using lidar. The feedforward controller is designed to assist conventional feedback controllers for generator torque and collective pitch angle in the transition between partial to full load operations. The design is based on a flatness-based approach presented in previous work, but is simplified by a linearization and adjusted to avoid large pitch actions caused by large mean wind speed changes. Additionally, a PI generator torque controller is designed for the 5 MW reference wind turbine. The transition region is extended by increasing the rated power to 8 MW in order to have a sufficient large range for testing the concept.

Simulations with a full aero-elastic model and coherent wind show that the combined feedback-feedforward controller follows the design objectives and is able to keep rotor speed and tower motion constant assuming perfect wind preview. Promising load reduction is achieved in simulations with turbulent wind and a lidar simulator. The energy production is also slightly decreased, but possibilities to avoid the loss or even improve the energy production are outlined.

The invention can also be applied for the following:
Design of a full feedback controller including a tower and drive train damper for the 8 MW wind turbine.
Design a strategy to smoothly enable and disable the multivariable feedforward controller when entering and leaving the region 2.5 and to combine it with the collective pitch feedforward controller.
Include the adjustment of the minimum pitch angle based on the lidar measurements as proposed in the known literature.
Test the proposed multivariable controller in a detailed load analysis with a higher turbulence level.
Determine the overall effect on energy production and load reduction of the concept.

The invention claimed is:

1. A control system for a wind turbine, comprising:
a feed forward controller having a rotor effective wind speed of the wind turbine as an input parameter and having a plurality of output parameters; and
a feedback controller,
wherein an input parameter is based on a rotor speed or a generator speed of the wind turbine and having at least one output parameter, and
wherein
one output parameter of the feed forward controller is provided to the feedback controller as an input parameter,
another output parameter of the feed forward controller is used as a feed-forward control parameter for controlling the wind turbine,
one output parameter of the feedback controller is used as a feed-back control parameter for controlling the wind turbine, and
the feedback controller has exactly one output parameter and the feed forward controller has exactly two output parameters.

2. The control system according to claim 1, wherein the feed-forward control parameter of the wind turbine controls a pitch angle of rotor blades of the wind turbine.

3. The control system according to claim 1, wherein the feed-back control parameter of the wind turbine controls a torque of a power generator of the wind turbine.

4. The control system according to claim 1, wherein the output parameter of the feed forward controller that is provided to the feedback controller as an input parameter is an updated generator torque rate.

5. The control system according to claim 1, wherein the output parameter of the feed forward controller that is used as a feed-forward control parameter of the wind turbine is an updated pitch angle of rotor blades of the wind turbine.

6. The control system according to claim 1, wherein the rotor effective wind speed is obtained using a Lidar device.

7. The control system according to claim 1, wherein the output parameters of the feed forward controller are calculated based on the input parameter.

8. The control system according to claim 1, wherein the exactly two output parameters of the feed forward controller are calculated such that an impact of the rotor effective wind speed of rotor and tower motion is compensated.

9. The control system according to claim 1, wherein a change over time of the rotor speed is reduced and/or a change over time of fore-aft displacement of a tower of the wind turbine is reduced and/or an acceleration of the fore-aft displacement of the tower of the wind turbine is reduced.

10. The control system according to claim 1, wherein the control system is useable to control the wind turbine in a transition from an operating of aerodynamic optimality to a full load operation.

11. The control system according to claim 1, wherein the control system is limited to controlling the wind turbine in a transition from an operation of aerodynamic optimality to a full load operation.

12. A wind turbine comprising the control system according to claim 1, a power generator, and a plurality of rotor blades.

13. A method for controlling a wind turbine, the method comprising:
obtaining a rotor effective wind speed of the wind turbine;
providing the rotor effective wind speed as an input parameter to a feed forward controller;
providing, by the feed forward controller, one output parameter referred to as a feed forward control parameter for controlling the wind turbine;
providing, by the feed forward controller, another output parameter referred to as a feed forward input parameter as an input parameter of a feedback controller;
providing, by the feedback controller, one output parameter referred to as a feedback control parameter for controlling the wind turbine,
wherein the feedback control parameter is based on the feed forward input parameter and a rotor speed or a generator speed of a power generator of the wind turbine,
wherein the feedback controller has exactly one output parameter and the feed forward controller has exactly two output parameters.

14. The method according to claim 13, wherein one or more steps of the method are repeatedly carried out.

* * * * *